US011797770B2

(12) United States Patent
Serban et al.

(10) Patent No.: US 11,797,770 B2
(45) Date of Patent: Oct. 24, 2023

(54) SELF-IMPROVING DOCUMENT CLASSIFICATION AND SPLITTING FOR DOCUMENT PROCESSING IN ROBOTIC PROCESS AUTOMATION

(71) Applicant: UiPath, Inc., New York, NY (US)

(72) Inventors: Tudor Serban, Cluj-Napoca (RO); Ioana Gligan, Cluj-Napoca (RO); Paul Parau, Sibiu (RO)

(73) Assignee: UiPath, Inc., New York, NY (US)

( * ) Notice: Subject to any disclaimer, the term of this patent is extended or adjusted under 35 U.S.C. 154(b) by 316 days.

(21) Appl. No.: 17/031,777

(22) Filed: Sep. 24, 2020

(65) Prior Publication Data

US 2022/0092263 A1 Mar. 24, 2022

(51) Int. Cl.
| | | |
|---|---|---|
| *G06F 17/00* | (2019.01) | |
| *G06F 40/284* | (2020.01) | |
| *G06F 40/205* | (2020.01) | |
| *G06V 30/414* | (2022.01) | |
| *G06F 18/214* | (2023.01) | |
| *G06F 18/2411* | (2023.01) | |

(52) U.S. Cl.
CPC .......... *G06F 40/284* (2020.01); *G06F 18/214* (2023.01); *G06F 18/2411* (2023.01); *G06F 40/205* (2020.01); *G06V 30/414* (2022.01)

(58) Field of Classification Search
CPC .. G06F 40/284; G06F 40/205; G06F 18/2411; G06F 18/214; G06F 16/335; G06F 40/103; G06F 40/295; G06V 30/414; G06K 9/6256; G06K 9/6269
USPC .......................................................... 704/9
See application file for complete search history.

(56) References Cited

U.S. PATENT DOCUMENTS

| 9,235,812 B2 | 1/2016 | Scholtes |
| 2006/0004721 A1* | 1/2006 | Bedworth ......... G06F 16/24522 |
| 2008/0174790 A1 | 7/2008 | Noguchi et al. |

(Continued)

FOREIGN PATENT DOCUMENTS

| CN | 111104805 A | 5/2020 |
| WO | 2019035765 A9 | 3/2019 |

*Primary Examiner* — Jason T Edwards
(74) *Attorney, Agent, or Firm* — CHIESA SHAHINIAN & GIANTOMASI PC

(57) ABSTRACT

Systems and methods for classifying and splitting an electronic file into a plurality of extracted documents are provided. The electronic file is received. An initial portion of the electronic file is classified using a trained classifier and extracted from the electronic file as an extracted document associated with the classification. It is iteratively determined whether each respective next portion of the electronic file should be added to the extracted document until it is determined that the respective next portion should not be added to the extracted document. In response to determining that the respective next portion should be added to the extracted document, the respective next portion is extracted from the electronic file and added to the extracted document. In response to determining that the respective next portion should not be added to the extracted document, the classifying and the iteratively determining are repeated using the respective next portion as the initial portion. The extracted documents are output. The trained classifier can be trained to learn sets of word vectors and other relevant information associated with document classifications, in order to improve accuracy.

26 Claims, 8 Drawing Sheets

(56) References Cited

U.S. PATENT DOCUMENTS

2014/0101542 A1\* 4/2014 Albrecht .............. G06F 16/335
　　　　　　　　　　　　　　　　　　　　715/256
2019/0294874 A1　9/2019 Orlov et al.
2019/0370540 A1　12/2019 Freed et al.
2019/0384794 A1\* 12/2019 Holly, Jr. .............. G06F 40/186
2020/0151591 A1　5/2020 Li
2020/0234183 A1　7/2020 Ohatage et al.

\* cited by examiner

SELF-IMPROVING DOCUMENT CLASSIFICATION AND SPLITTING FOR DOCUMENT PROCESSING IN ROBOTIC PROCESS AUTOMATION

TECHNICAL FIELD

The present invention relates generally to robotic process automation (RPA), and more particularly to self-improving document classification and splitting for document processing in RPA.

BACKGROUND

Robotic process automation (RPA) is a form of process automation that uses software robots to automate workflows. RPA may be implemented to automate repetitive and/or labor-intensive tasks to reduce costs and increase efficiency. One important task in RPA is document processing. Document processing often involves the extraction of information from an electronic computer file, which may include various pages associated with different types of documents. For example, such an electronic computer file may include invoices, reports, insurance forms, etc. There are no existing solutions for splitting such an electronic computer file according to document type that are suitable for document processing in RPA.

BRIEF SUMMARY OF THE INVENTION

In accordance with one or more embodiments, systems and methods for classifying and splitting an electronic file into a plurality of extracted documents are provided. The electronic file is received. An initial portion of the electronic file is classified and extracted from the electronic file as an extracted document associated with the classification. It is iteratively determined whether each respective next portion of the electronic file should be added to the extracted document until it is determined that the respective next portion should not be added to the extracted document. In response to determining that the respective next portion should be added to the extracted document, the respective next portion is extracted from the electronic file and added to the extracted document. In response to determining that the respective next portion should not be added to the extracted document, the classifying and the iteratively determining are repeated using the respective next portion as the initial portion. The extracted documents are output.

In one embodiment, it is iteratively determined whether each respective next portion of the electronic file should be added to the extracted document based on 1) a confidence that the respective next portion is part of the extracted document and 2) a confidence that the next respective portion is a start of a new extracted document. A bonus or a penalty may be applied to the confidence that the respective next portion is part of the extracted document and the confidence that the next respective portion is the start of the new extracted document based on a length of the extracted document relative to an expected length of an extracted document associated with the classification.

In one embodiment, the initial portion of the electronic file is classified using a trained classifier. The trained classifier is trained to learn sets of word vectors associated with document classifications. The trained classifier is trained by parsing text of training data into tokens, assigning a score to each token, and calculating an average of the scores for the tokens. The score is assigned to each token based on how close the token is to a start of a document in the training data and a frequency of appearance of the token in the document in the training data.

In one embodiment, the initial portion of the electronic file is determined as a first portion of the electronic file that is able to be classified. The initial portion of the electronic file may be determined as the first portion of the electronic file that is able to be classified based on a certainty of the classification.

In one embodiment, extracted documents that are associated with the same classification may be combined.

These and other advantages of the invention will be apparent to those of ordinary skill in the art by reference to the following detailed description and the accompanying drawings.

DETAILED DESCRIPTION

Figure 1:
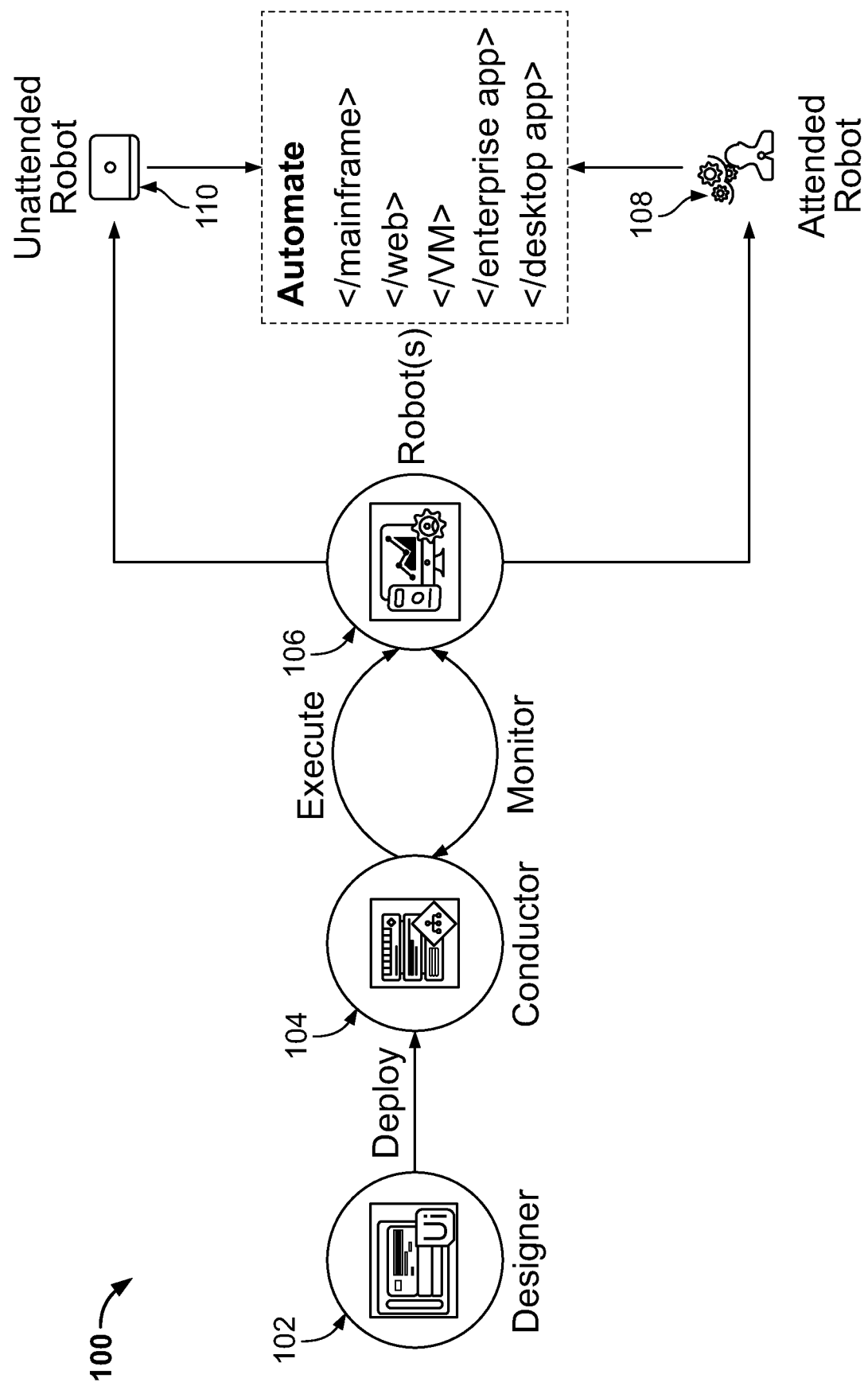
FIG. 1 is an architectural diagram illustrating a robotic process automation (RPA) system, according to an embodiment of the invention.

Robotic process automation (RPA) is used for automating workflows and processes. FIG. 1 is an architectural diagram of an RPA system 100, in accordance with one or more embodiments. As shown in FIG. 1, RPA system 100 includes a designer 102 to allow a developer to design automation processes. More specifically, designer 102 facilitates the development and deployment of RPA processes and robots for performing activities in the processes. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a process, defined herein as "activities." Each activity may include an action, such as clicking a button, reading a file, writing to a log panel, etc. In some embodiments, processes may be nested or embedded.

Some types of processes may include, but are not limited to, sequences, flowcharts, Finite State Machines (FSMs), and/or global exception handlers. Sequences may be particularly suitable for linear processes, enabling flow from one activity to another without cluttering a process. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a process is developed in designer 102, execution of business processes is orchestrated by a conductor 104, which orchestrates one or more robots 106 that execute the processes developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of RPA robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run processes built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
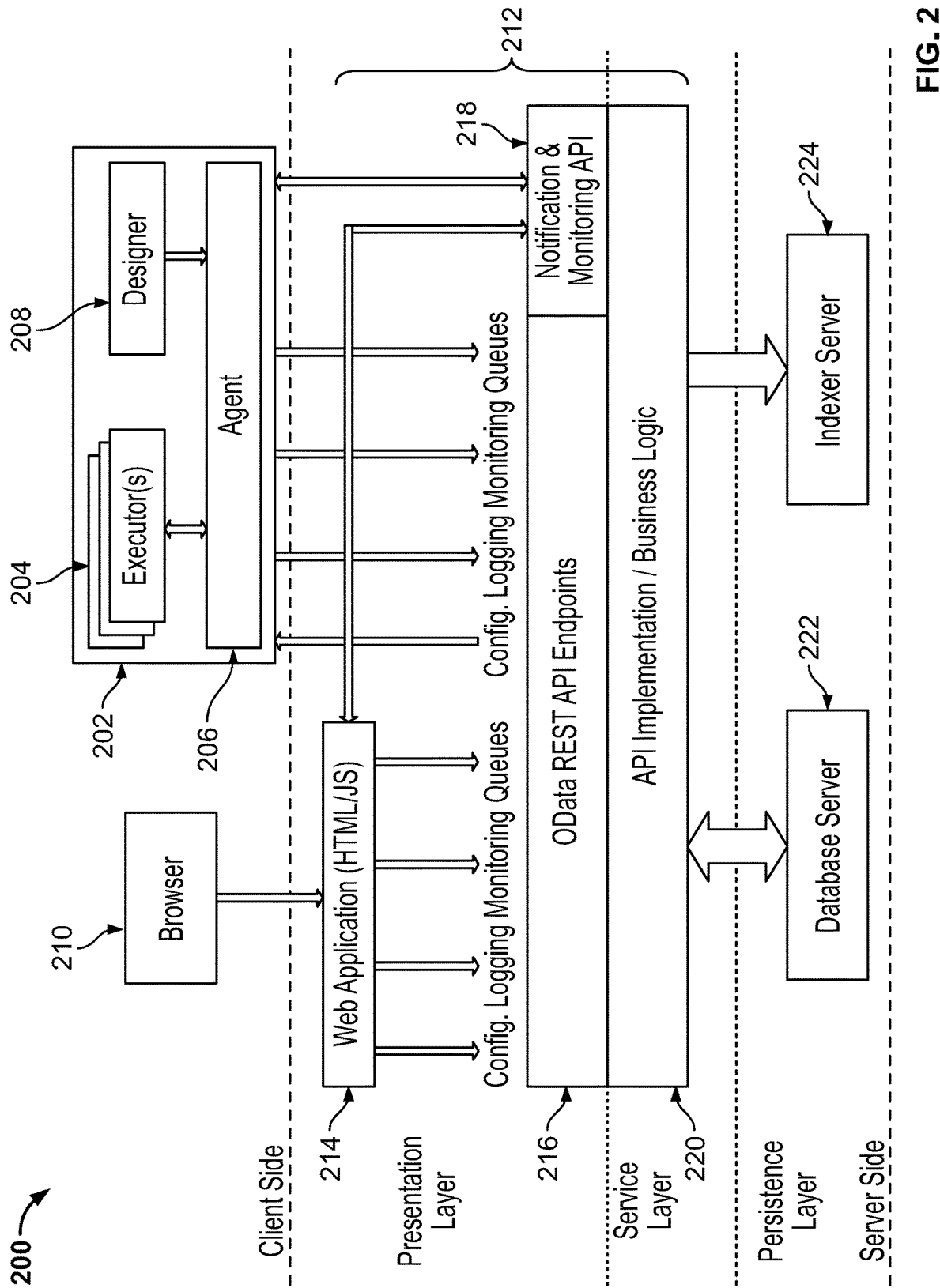
FIG. 2 is an architectural diagram illustrating an example of a deployed RPA system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
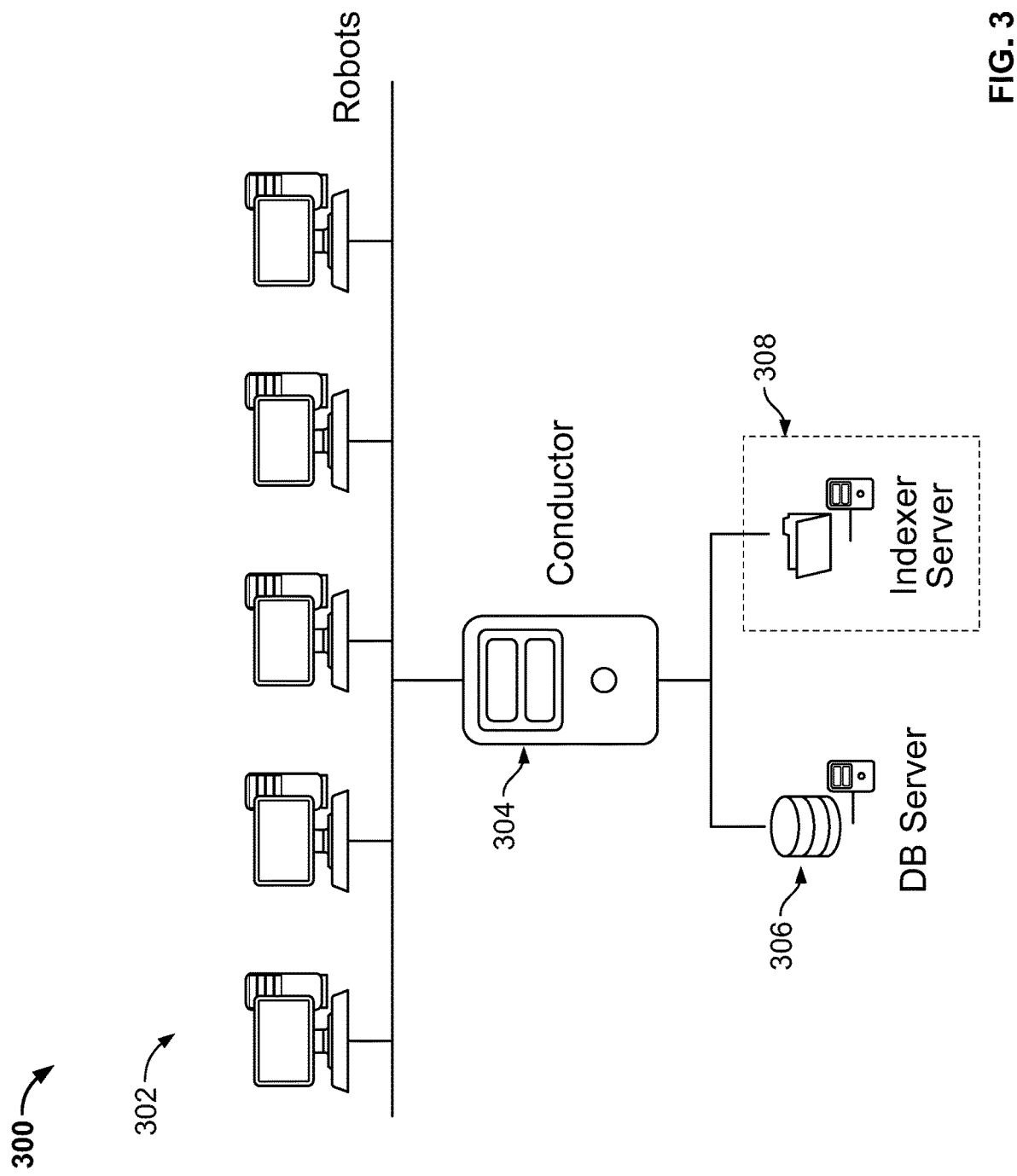
FIG. 3 is an architectural diagram illustrating a simplified deployment example of a RPA system, according to an embodiment of the invention.

FIG. 3 is an architectural diagram illustrating a simplified deployment example of RPA system 300, in accordance with one or more embodiments. In some embodiments, RPA system 300 may be, or may include, RPA systems 100 and/or 200 of FIGS. 1 and 2, respectively. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

RPA system 300 may be implemented for classifying and splitting electronic computer files for document processing. In accordance with one or more embodiments, pages of an electronic file are evaluated in a page-by-page manner to classify and extract documents from the electronic file. Each extracted document comprises one or more contiguous ranges of pages extracted from the electronic file and is associated with a different classification. Advantageously, the extracted documents generated in accordance with embodiments described herein are suitable for use in document processing for RPA.

Figure 4:
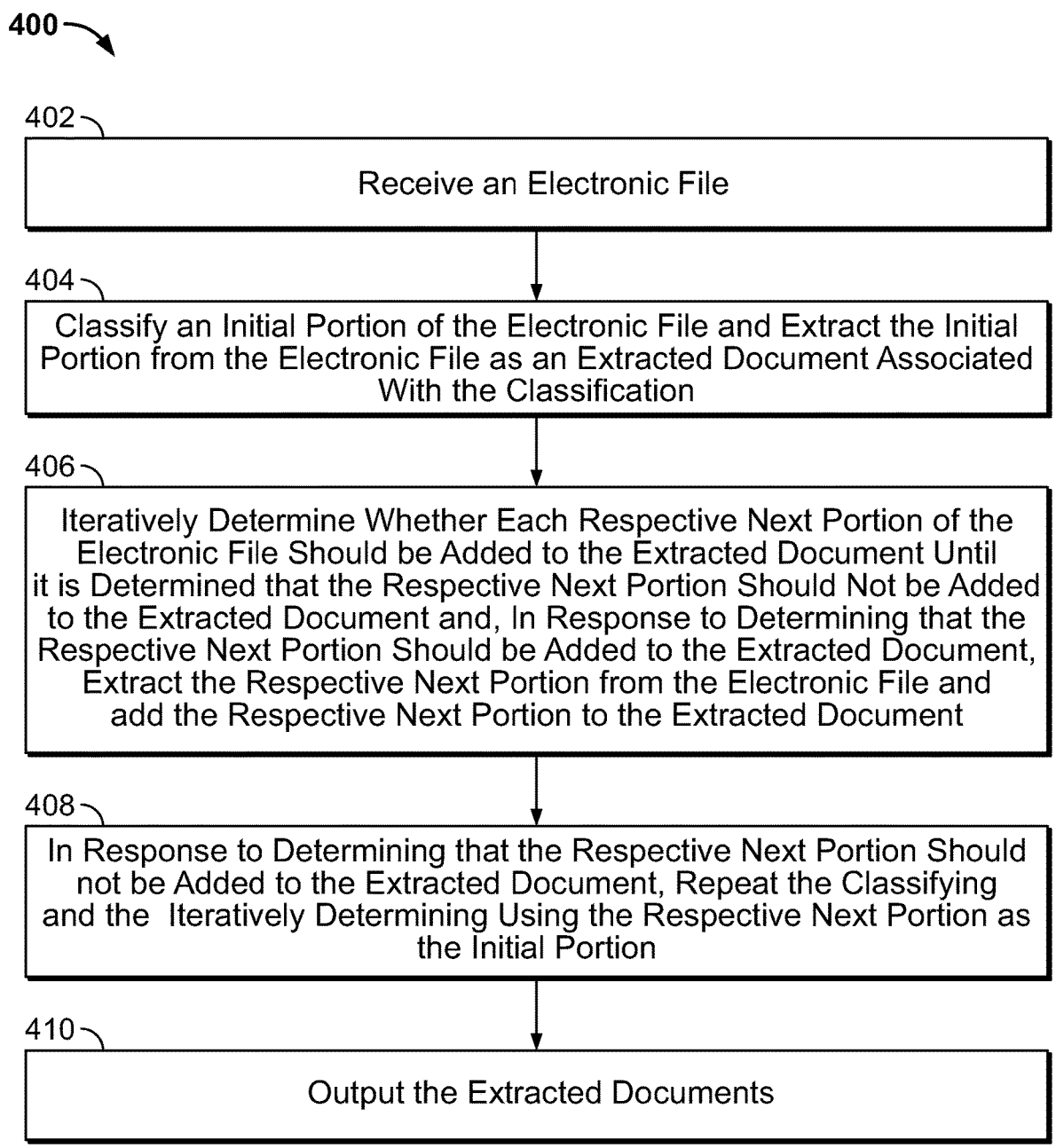
FIG. 4 shows a method for classifying and splitting an electronic computer file, according to an embodiment of the invention.

FIG. 4 shows a method 400 for classifying and splitting an electronic computer file, in accordance with one or more embodiments. Method 400 may be performed by one or more suitable computing devices, such as, e.g., computer 800 of FIG. 8.

At step 402, an electronic file is received. The electronic file includes a number of portions. In one embodiment, each portion of the electronic file corresponds to a page of the electronic file. However, it should be understood that the portions of the electronic file may be any suitable portions, such as, e.g., paragraphs of the electronic file, sections of the electronic file, etc. The portions of the electronic file are associated with various document types. For example, the portions may be associated with invoices, reports, insurance forms, or any other suitable document type.

The electronic file may be in any suitable format, such as, e.g., PDF (portable document format). The electronic file may be received by loading a previously stored electronic file from a storage or memory of a computer system or by receiving an electronic file transmitted from a remote computer system.

At step 404, an initial portion of the electronic file is classified and extracted from the electronic file as an extracted document associated with the classification. The initial portion is classified to a document type (e.g., invoices, reports, insurance forms, etc.). In one embodiment, the initial portion of the electronic file is determined as the first portion (i.e., the portion of the electronic file before all other portions) of the electronic file that is able to be classified. Portions of the electronic file that are not able to be classified may include portions of the electronic file that are blank or that depict an image. In one embodiment, portions of the electronic file that are not able to be classified include portions that are classified with a certainty that is not sufficiently high (e.g., based on a threshold). Portions of the electronic file that are not able to be classified may be presented to a user for receiving user input for manual classification or may be discarded.

In one embodiment, the initial portion of the electronic file is classified using a trained classifier. The trained classifier is trained to learn sets of word vectors associated with document classifications to classify portions of the electronic file during a prior offline or training phase. In one embodiment, the trained classifier is trained according to method 500 of FIG. 5, described in detail below. Once trained, the trained classifier is applied at step 404 to classify the initial portion of the electronic file during an online or testing phase. In one embodiment, the trained classifier is based on the Rocchio algorithm and the vector space model. However, the trained classifier may be any classifier suitable for classifying the initial portion of the electronic file. For example, the trained classifier may be a machine learning based classifier.

In one embodiment, the trained classifier is the classifier disclosed in U.S. patent application Ser. No. 16/587,386, filed Sep. 30, 2019, the disclosure of which is incorporated herein by reference in its entirety.

At step 406, it is iteratively determined whether each respective next portion of the electronic file should be added to the extracted document until it is determined that the respective next portion should not be added to the extracted document. In response to determining that the respective next portion should be added to the extracted document, the respective next portion is extracted from the electronic file and added to the extracted document. As step 406 is iteratively performed, each respective next portion of the electronic file is iteratively added to the extracted document in a portion-by-portion manner (until it is determined that the respective next portion should not be added to the extracted document). The next portion of the electronic file refers to a subsequent portion of the electronic file (e.g., subsequent to the initial portion or subsequent to a previous next portion). In one embodiment, the next portion refers to an immediately subsequent portion of the electronic file.

In one embodiment, it is determined whether a respective next portion of the electronic file should be added to the extracted document by comparing: 1) the confidence that the respective next portion is part of the extracted document (i.e., that the respective next portion has the same overall content as the extracted document) and 2) the confidence that the next respective portion is the start of a new extracted document. In one embodiment, the confidence that the respective next portion is part of the extracted document and the confidence that the next respective portion is the start of a new extracted document are computed based on the inverse exponential of the Euclidean distance between the word vector representing the classifier training data for a given document type and the word vector of the evaluated portion of the document. In another embodiment, the confidence that the respective next portion is part of the extracted document and the confidence that the next respective portion is the start of a new extracted document are computed based on document layout similarity metrics, or a combination of Euclidean distance and layout similarity.

In one embodiment, a bonus or a penalty may be applied to the confidence that the respective next portion is part of the extracted document and/or the confidence that the next respective portion is the start of a new extracted document based on the length of the extracted document relative to the expected length of an extracted document associated with the classification. For example, a bonus may be applied to the confidence that the respective next portion is part of the extracted document and a penalty may be applied to the confidence that the next respective portion is the start of a new extracted document where the length of the extracted document is shorter than the expected length of a document for the classification (and vice versa).

By determining whether a respective next portion of the electronic file should be added to the extracted document based on the confidence that the respective next portion is part of the extracted document and the confidence that the next respective portion is the start of a new extracted document are computed, the accuracy of the splitting of the electronic file will be relatively higher as compared to splitting of the electronic file based only on a classification of each portion.

At step 408, in response to determining that the respective next portion should not be added to the extracted document, the classifying (step 404) and the iteratively determining (step 406) are repeated using the respective next portion as the initial portion. During each iteration of the repetition of steps 404 and 406, a new extracted document is extracted from the electronic file to thereby generate a plurality of extracted documents associated with various classifications.

In one embodiment, where an extracted document is associated with the same particular classification as another extracted document, the extracted may be combined or merged into a single extracted document associated with the particular classification.

At step 410, the extracted documents are output. In one embodiment, the extracted documents may be output once there are no further additional respective next portions of the electronic file. The extracted documents may be output by, for example, displaying the extracted documents on a display device of a computer system or by storing the extracted documents on a memory or storage of a computer system. In one embodiment, prior to being output, blank portions may be removed from the extracted documents.

In one embodiment, the extracted documents are output for further document processing for performing an RPA task.

Figure 5:
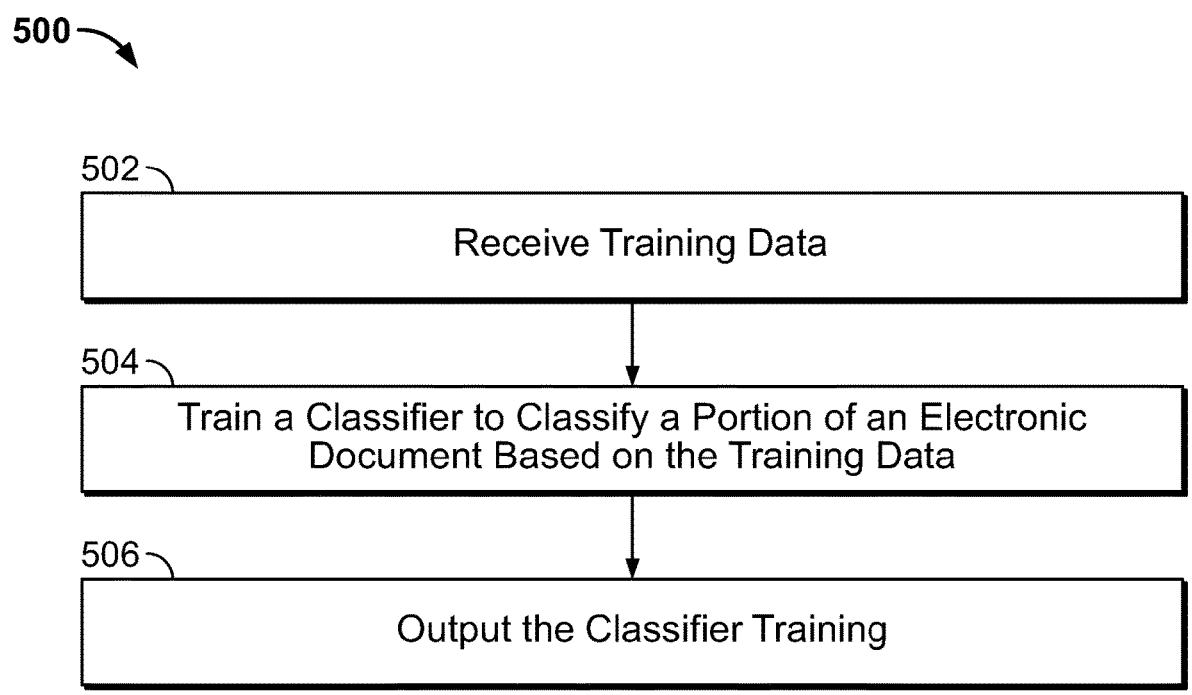
FIG. 5 shows a method for training a classifier for classifying a portion of an electronic file, according to an embodiment of the invention.

FIG. 5 shows a method 500 for training a classifier for classifying a portion of an electronic file, in accordance with one or more embodiments. Method 500 is performed during an offline or training phase. Once trained, the trained classifier is applied to classify a portion of an electronic file during an online or testing phase. In one embodiment, the classifier trained according to method 500 may be applied during an online phase at step 404 of FIG. 4 to classify an initial portion of an electronic file. Method 500 may be performed by one or more suitable computing devices, such as, e.g., computer 800 of FIG. 8.

At step 502, training data is received. The training data comprises one or more training documents and an indication of one or more associated document types.

Figure 6:
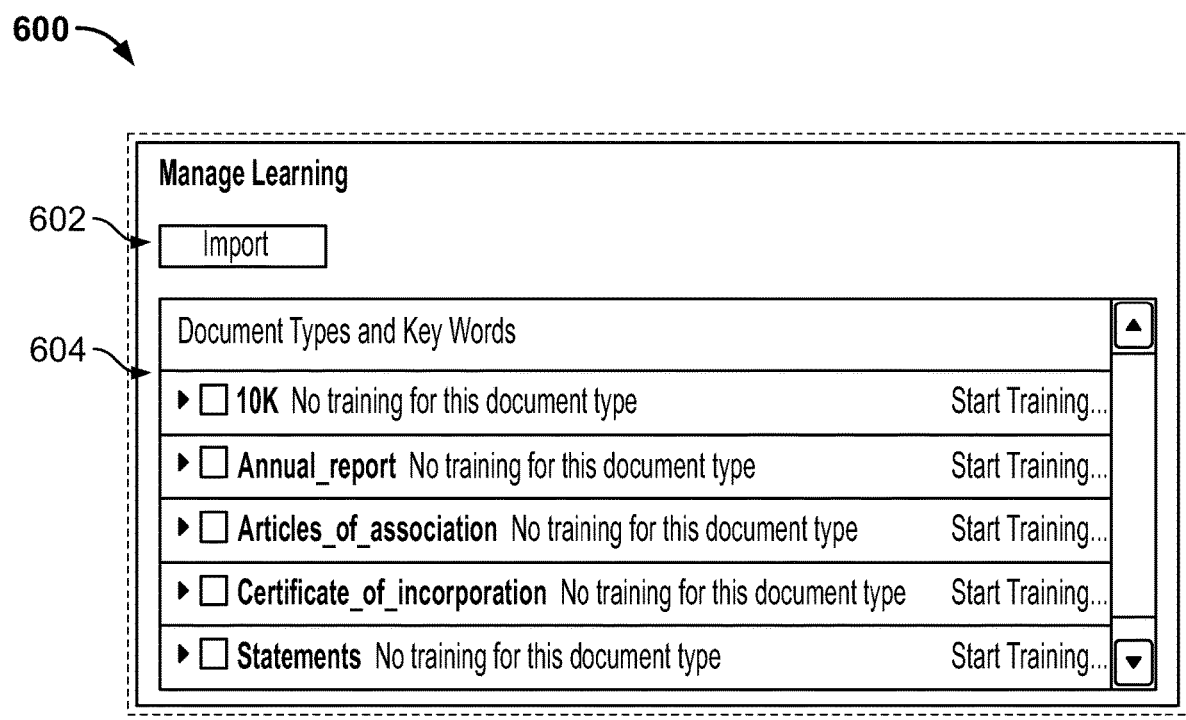
FIG. 6 shows an exemplary user interface for training a classifier based on training data, according to an embodiment of the invention.

FIG. 6 shows an exemplary user interface 600 for training a classifier based on training data, in accordance with one or more embodiments. A user may import a set of training documents by selecting the import icon 602 and may select one or more document types that the training documents are to be associated with in window 604. Window 604 shows exemplary document types including 10K, Annual_report, Articles_of_association, Certificate_of_incorporation, and Statements.

At step 504 of FIG. 5, a classifier is trained to classify a portion of an electronic document based on the training data. In one embodiment, during training, the classifier learns sets of word vectors (e.g., keywords) corresponding to document types. The classifier reads the contents of the training data to identify the word vectors representing the most relevant words that are present in the training data. In one embodiment, the word vectors do not include certain stop words, dates, and numbers. In another embodiment, the classifier learns page and document layout information.

In one embodiment, the classifier is trained based on Rocchio classification and the vector space model, with a custom-built scoring approach. The classifier parses the text of the training data into tokens. After some processing (e.g., to remove stop words, date, and numbers), each token is assigned a score calculated based on, e.g., how close the token is to the start of the document in the training data and a frequency of appearance of the token in the document in the training data. In one embodiment, the score is further calculated based on layout information, font information, document length statistics, interpretation of header and footer information, a penalty mechanism for incorrect classifications, and other suitable factors. The scores for each token in the training data are used to calculate or update a running average (corresponding to the centroid in Rocchio classification). The running average refers to the average score of a token calculated across all documents that are used for training and is updated at each training step (with each new input document). The resulting vector contains average scores for all tokens that were encountered during training.

In one embodiment, the word vectors learned from the training data may be combined with previously learned word vectors learned from prior training data for the same document type. The word vectors and the previously learned word vectors are merged into a combined set of word vectors and each combined word vector is ordered based on the combined score of each token (e.g., from highest to lowest). The word vectors for the document type are then determined from the ordered combined set of word vectors. For example, the tokens from each word vector for the document type may be determined as the top N tokens by score or the top N % tokens by score, where N is a positive integer.

Figure 7:
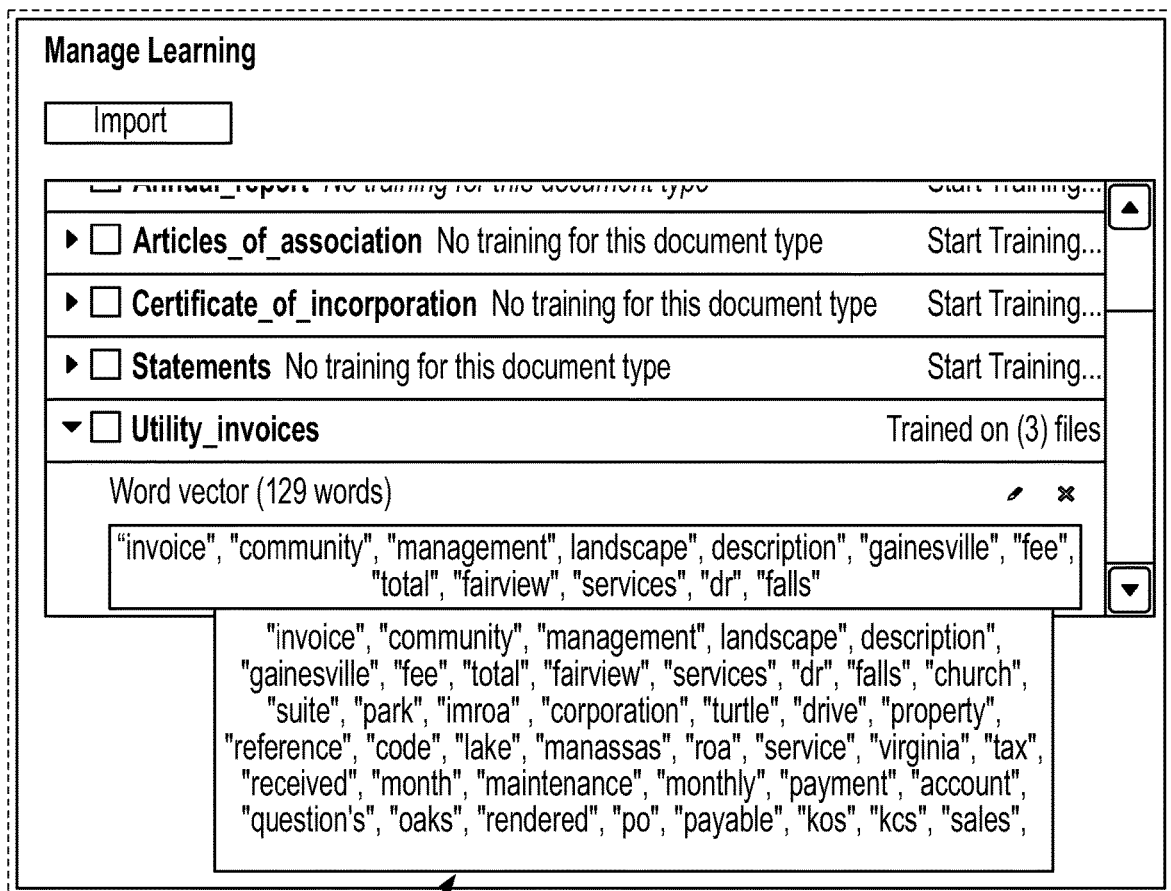
FIG. 7 shows another exemplary user interface for training a classifier based on training data, according to an embodiment of the invention.

FIG. 7 shows an exemplary user interface 700 for training a classifier based on training data, in accordance with one or more embodiments. A shown in user interface 700, a set of word vectors 702 is learned for the document type "Utility_invoices" based on three training files.

At step 506 of FIG. 5, the classifier training is output. The classifier training may be output by, for example, storing the classifier training on a memory or storage of a computer system or by transmitting the classifier training to a remote computer system. The classifier training may then be retrieved from memory for classifying a portion of an electronic file during an online phase. Advantageously, the classifier trained according to method 500 is relatively lightweight and simple, but reasonably effective at autonomous classification of portions of an electronic file.

In one embodiment, the classifier, using the classifier training, classifies portions of an electronic file and user feedback on the results of the classification is captured using a validation user interface. The user feedback may be used to re-train the classifier and update the classifier training to improve accuracy of the classifier. In one embodiment, the classifier, using the classifier training, is applied to an electronic file comprising portions of a new document type that the classifier was not trained to classify and the user feedback is used to update the classifier training to learn the new document type.

Figure 8:
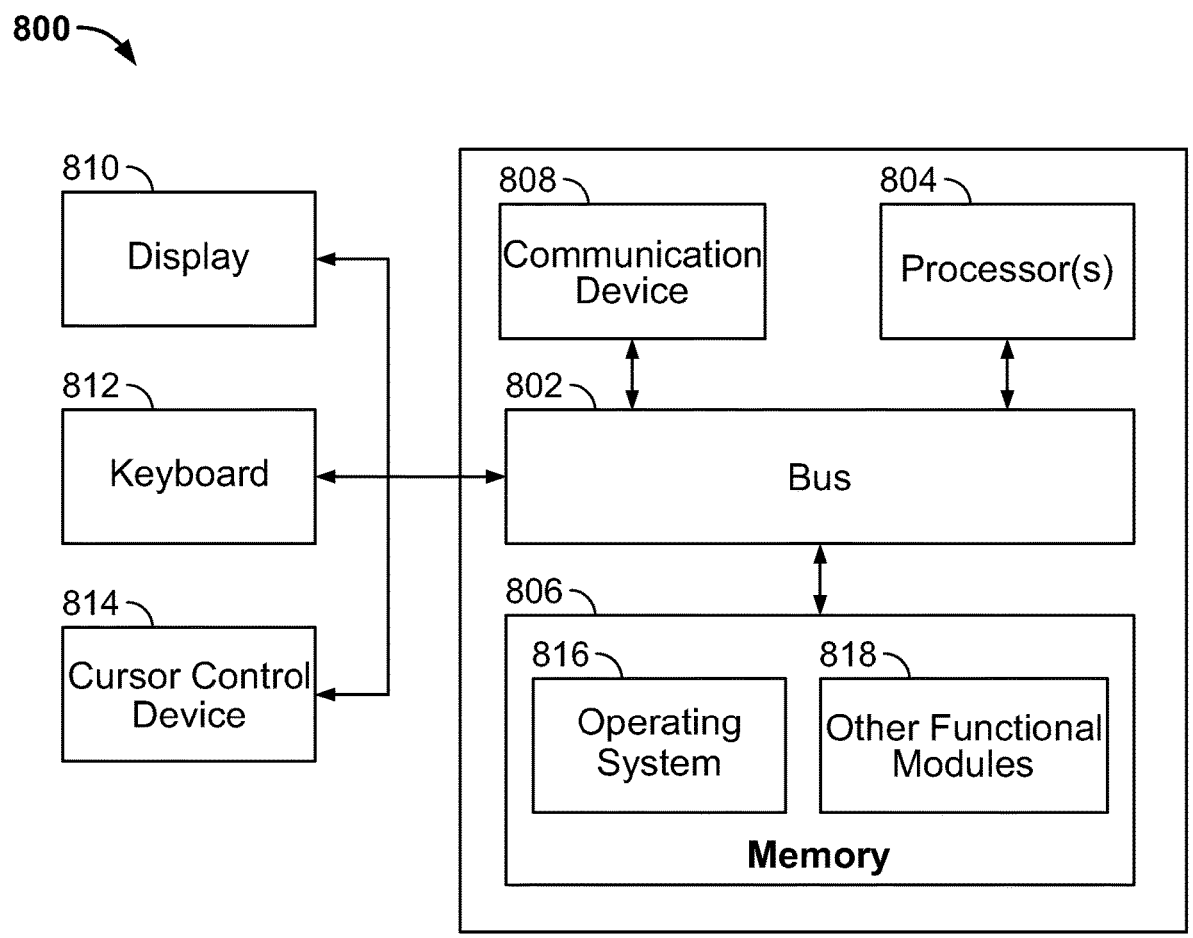
FIG. 8 is a block diagram of a computing system according to an embodiment of the invention.

FIG. 8 is a block diagram illustrating a computing system 800 configured to execute the methods, workflows, and processes described herein, including the methods shown in FIGS. 4 and 5, according to an embodiment of the present invention. In some embodiments, computing system 800 may be one or more of the computing systems depicted and/or described herein. Computing system 800 includes a bus 802 or other communication mechanism for communicating information, and processor(s) 804 coupled to bus 802 for processing information. Processor(s) 804 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 804 may also have multiple processing cores, and at least some of the cores may be configured to perform specific functions. Multi-parallel processing may be used in some embodiments.

Computing system 800 further includes a memory 806 for storing information and instructions to be executed by processor(s) 804. Memory 806 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 804 and may include volatile media, non-volatile media, or both. The media may also be removable, non-removable, or both.

Additionally, computing system 800 includes a communication device 808, such as a transceiver, to provide access to a communications network via a wireless and/or wired connection according to any currently existing or future-implemented communications standard and/or protocol.

Processor(s) 804 are further coupled via bus 802 to a display 810 that is suitable for displaying information to a user. Display 810 may also be configured as a touch display and/or any suitable haptic I/O device.

A keyboard 812 and a cursor control device 814, such as a computer mouse, a touchpad, etc., are further coupled to bus 802 to enable a user to interface with computing system. However, in certain embodiments, a physical keyboard and mouse may not be present, and the user may interact with the device solely through display 810 and/or a touchpad (not shown). Any type and combination of input devices may be used as a matter of design choice. In certain embodiments, no physical input device and/or display is present. For instance, the user may interact with computing system 800 remotely via another computing system in communication therewith, or computing system 800 may operate autonomously.

Memory 806 stores software modules that provide functionality when executed by processor(s) 804. The modules include an operating system 816 for computing system 800 and one or more additional functional modules 818 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method comprising:
    classifying an initial portion of an electronic file and extracting the initial portion from the electronic file as an extracted document associated with the classification;
    iteratively determining whether each respective next portion of the electronic file should be added to the extracted document until it is determined that the respective next portion should not be added to the extracted document and, in response to determining that the respective next portion should be added to the extracted document, extracting the respective next portion from the electronic file and adding the respective next portion to the extracted document, wherein the iteratively determining whether each respective next portion of the electronic file should be added to the extracted document is based on a length of the extracted document relative to an expected length of another extracted document associated with the classification;
    in response to determining that the respective next portion should not be added to the extracted document, repeating the classifying and the iteratively determining using the respective next portion as the initial portion; and
    outputting the extracted documents.

2. The computer-implemented method of claim 1, wherein iteratively determining whether each respective next portion of the electronic file should be added to the extracted document until it is determined that the respective next portion should not be added to the extracted document comprises:
    iteratively determining whether each respective next portion of the electronic file should be added to the extracted document based on 1) a confidence that the respective next portion is part of the extracted document and 2) a confidence that the next respective portion is a start of a new extracted document.

3. The computer-implemented method of claim 2, wherein iteratively determining whether each respective next portion of the electronic file should be added to the extracted document based on 1) a confidence that the respective next portion is part of the extracted document and 2) a confidence that the next respective portion is a start of a new extracted document comprises:
    applying a bonus or a penalty to the confidence that the respective next portion is part of the extracted document and the confidence that the next respective portion is the start of the new extracted document based on the length of the extracted document relative to the expected length of the other extracted document associated with the classification.

4. The computer-implemented method of claim 1, wherein classifying an initial portion of the electronic file comprises:
    classifying the initial portion of the electronic file using a trained classifier, the trained classifier trained to learn sets of word vectors associated with document classifications.

5. The computer-implemented method of claim 4, wherein the trained classifier is trained by:
parsing text of training data into tokens;
assigning a score to each token; and
calculating an average of the scores for the tokens.

6. The computer-implemented method of claim 5, wherein assigning a score to each token comprises:
assigning the score to each token based on how close the token is to a start of a document in the training data and a frequency of appearance of the token in the document in the training data.

7. The computer-implemented method of claim 1, wherein classifying an initial portion of the electronic file comprises:
determining the initial portion of the electronic file as a first portion of the electronic file that is able to be classified.

8. The computer-implemented method of claim 7, wherein determining the initial portion of the electronic file as a first portion of the electronic file that is able to be classified comprises:
determining the initial portion of the electronic file as the first portion of the electronic file that is able to be classified based on a certainty of the classification.

9. The computer-implemented method of claim 1, further comprising:
combining extracted documents that are associated with the same classification.

10. The computer-implemented method of claim 1, wherein the classifying, the iteratively determining, the repeating, and the outputting are performed by one or more computing devices implemented in a cloud computing system.

11. An apparatus comprising:
a memory storing computer instructions; and
at least one processor configured to execute the computer instructions, the computer instructions configured to cause the at least one processor to perform operations of:
classifying an initial portion of an electronic file and extracting the initial portion from the electronic file as an extracted document associated with the classification;
iteratively determining whether each respective next portion of the electronic file should be added to the extracted document until it is determined that the respective next portion should not be added to the extracted document and, in response to determining that the respective next portion should be added to the extracted document, extracting the respective next portion from the electronic file and adding the respective next portion to the extracted document, wherein the iteratively determining whether each respective next portion of the electronic file should be added to the extracted document is based on a length of the extracted document relative to an expected length of another extracted document associated with the classification;
in response to determining that the respective next portion should not be added to the extracted document, repeating the classifying and the iteratively determining using the respective next portion as the initial portion; and
outputting the extracted documents.

12. The apparatus of claim 11, wherein iteratively determining whether each respective next portion of the electronic file should be added to the extracted document until it is determined that the respective next portion should not be added to the extracted document comprises:
iteratively determining whether each respective next portion of the electronic file should be added to the extracted document based on 1) a confidence that the respective next portion is part of the extracted document and 2) a confidence that the next respective portion is a start of a new extracted document.

13. The apparatus of claim 12, wherein iteratively determining whether each respective next portion of the electronic file should be added to the extracted document based on 1) a confidence that the respective next portion is part of the extracted document and 2) a confidence that the next respective portion is a start of a new extracted document comprises:
applying a bonus or a penalty to the confidence that the respective next portion is part of the extracted document and the confidence that the next respective portion is the start of the new extracted document based on the length of the extracted document relative to the expected length of the other extracted document associated with the classification.

14. The apparatus of claim 11, wherein classifying an initial portion of the electronic file comprises:
classifying the initial portion of the electronic file using a trained classifier, the trained classifier trained to learn sets of word vectors associated with document classifications.

15. The apparatus of claim 14, wherein the trained classifier is trained by:
parsing text of training data into tokens;
assigning a score to each token; and
calculating an average of the scores for the tokens.

16. The apparatus of claim 15, wherein assigning a score to each token comprises:
assigning the score to each token based on how close the token is to a start of a document in the training data and a frequency of appearance of the token in the document in the training data.

17. The apparatus of claim 11, wherein the apparatus is implemented in a cloud computing system.

18. A non-transitory computer-readable medium storing computer program instructions, the computer program instructions when executed by at least one processor cause the at least one processor to perform operations comprising:
classifying an initial portion of an electronic file and extracting the initial portion from the electronic file as an extracted document associated with the classification;
iteratively determining whether each respective next portion of the electronic file should be added to the extracted document until it is determined that the respective next portion should not be added to the extracted document and, in response to determining that the respective next portion should be added to the extracted document, extracting the respective next portion from the electronic file and adding the respective next portion to the extracted document, wherein the iteratively determining whether each respective next portion of the electronic file should be added to the extracted document is based on a length of the extracted document relative to an expected length of another extracted document associated with the classification;
in response to determining that the respective next portion should not be added to the extracted document, repeating the classifying and the iteratively determining using the respective next portion as the initial portion; and outputting the extracted documents.

19. The non-transitory computer-readable medium of claim 18, wherein iteratively determining whether each respective next portion of the electronic file should be added to the extracted document until it is determined that the respective next portion should not be added to the extracted document comprises:
iteratively determining whether each respective next portion of the electronic file should be added to the extracted document based on 1) a confidence that the respective next portion is part of the extracted document and 2) a confidence that the next respective portion is a start of a new extracted document.

20. The non-transitory computer-readable medium of claim 18, wherein classifying an initial portion of the electronic file comprises:
classifying the initial portion of the electronic file using a trained classifier, the trained classifier trained to learn sets of word vectors associated with document classifications.

21. The non-transitory computer-readable medium of claim 20, wherein the trained classifier is trained by:
parsing text of training data into tokens;
assigning a score to each token; and
calculating an average of the scores for the tokens.

22. The non-transitory computer-readable medium of claim 21, wherein assigning a score to each token comprises:
assigning the score to each token based on how close the token is to a start of a document in the training data and a frequency of appearance of the token in the document in the training data.

23. The non-transitory computer-readable medium of claim 18, wherein classifying an initial portion of the electronic file comprises:
determining the initial portion of the electronic file as a first portion of the electronic file that is able to be classified.

24. The non-transitory computer-readable medium of claim 23, wherein determining the initial portion of the electronic file as a first portion of the electronic file that is able to be classified comprises:
determining the initial portion of the electronic file as the first portion of the electronic file that is able to be classified based on a certainty of the classification.

25. The non-transitory computer-readable medium of claim 18, the operations further comprising:
combining extracted documents that are associated with the same classification.

26. The non-transitory computer-readable medium of claim 18, wherein the at least one processor is implemented in one or more computing devices and the one or more computing devices are implemented in a cloud computing system.

* * * * *